W. H. Allen,
Leaching Apparatus;
№ 1,844, Reissued Jan. 3, 1865.
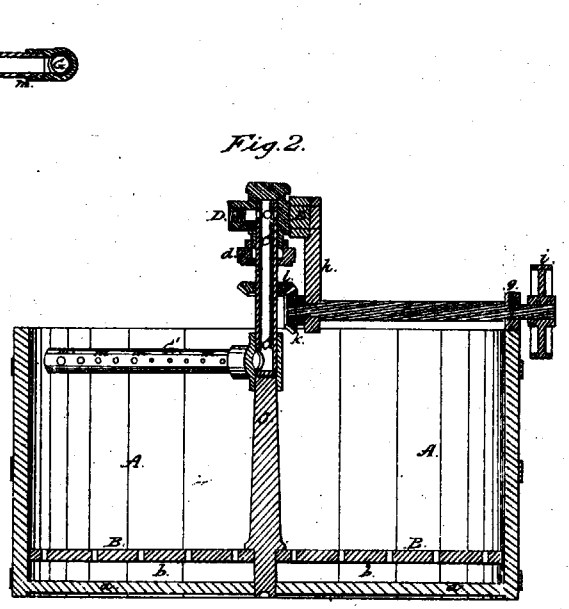
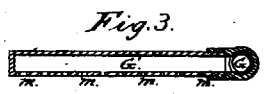
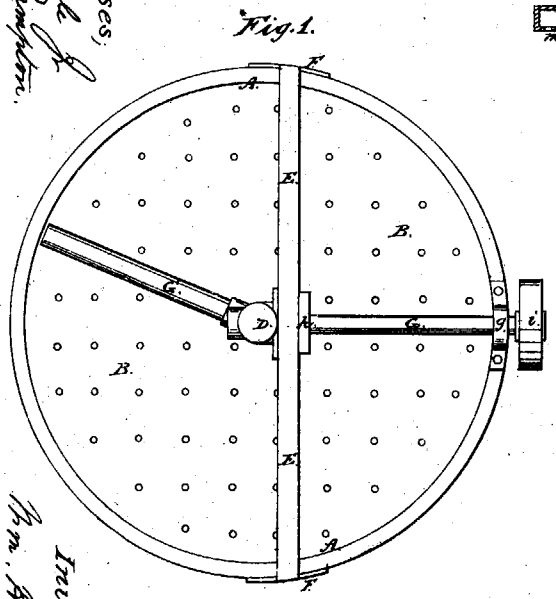
Witnesses;
F. P. Hale Jr.
J. R. Bampton.
Inventor;
Wm. H. Allen

UNITED STATES PATENT OFFICE.

WILLIAM H. ALLEN OF FRYEBURG, MAINE, ASSIGNOR TO WILLIAM H. ALLEN AND OTIS WARREN.

IMPROVED APPARATUS FOR LEACHING TAN-BARK AND PREPARING EXTRACTS.

Specification forming part of Letters Patent No. 36,048, dated July 29, 1862; Reissue No. 1,844, dated January 3, 1865.

*To all whom it may concern:*

Be it known that I, WILLIAM H. ALLEN, a citizen of the United States, and a resident of Fryeburg, in the county of Oxford and State of Maine, have invented a new and useful Improvement in Apparatus for Leaching Bark or other material; and I do hereby declare the same to be fully described in the following specification, and represented in the accompanying drawings, of which—

Figure 1 is a top view, and Fig. 2 a vertical and transverse section, of a leaching-vat provided with my invention. Fig. 3 is a horizontal and longitudinal section of the perforated distributing arm or tube, to be hereinafter described.

The purpose of my invention is to distribute water or any other leaching-liquid in fine streams and evenly on the upper surface of the mass of bark or other material to be leached.

My invention is specially adapted for extracting tannin from bark, but is equally applicable to leaching wood-ashes for the purpose of obtaining an alkaline lye therefrom.

In carrying out my invention I employ a tub or vat, A, furnished with a perforated false bottom or strainer, B, which, in the drawings, is exhibited as elevated somewhat above the real bottom *a* in order that there may be a liquor-receiving space, *b*, between the two. From the central part of the bottom *a* a post, *c*, rises vertically and receives on its top and gives support to the closed lower end of a rotary tubular shaft, C, whose upper end is open and extends into a stuffing-box, *d*, fixed on the lower end of a chambered conduit-elbow, D. The said elbow is fastened to the side of a cross-bar, E, which is supported by two standards, F F, and is extended over the vat, as shown in the drawings.

A horizontal shaft, G, is sustained by a box, *g*, and a hanger, *h*, arranged with respect to the tub or vat, as shown in Figs. 1 and 2. A driving-pulley, *i*, is fixed on the outer end of the shaft, while a beveled pinion or gear, K, is attached to the inner end of such shaft and engages with another beveled gear, *l*, fixed on the tubular shaft C.

A hollow or chambered arm, G′, extends horizontally from the shaft C, opens into it, is closed at its outer end, and along one side is provided with a series of openings, *m m m m*, &c. These openings are arranged at equal distances apart, and as they vary in their distances from the center of the shaft C are increased in size, their areas being to one another in the proportions of the circumferences of their circles of revolution or thereabout in order that each hole, while the machine may be in action, may discharge a like amount of liquid on a like extent of surface traversed by it—that is to say, if we suppose the first hole of the series to be situated at any given distance from the axis of the vertical shaft C and the third hole to be twice that distance from such axis, it will be evident that during each entire revolution of the shaft C the said third hole will pass over twice the surface that the first hole does, and consequently should discharge twice the amount of liquid that may be thrown out of the first, it being supposed that the pressure within the shaft C is constant, and also that the delivery of the two holes is not materially impeded by friction. The ratio of the sizes, therefore, of the several holes will be very nearly that of the circumferences of circles in which they travel, due allowance being made for friction.

In the process of leaching bark it has been customary to pour the water indiscriminately over the surface of the mass or allow it to stand in a large quantity on the same. Under these circumstances so rapid a percolation or infiltration of the liquid takes place as to produce a very imperfect extraction of the tannin. The purpose of my invention is to induce a slow and even percolation of the fluid through the mass of the bark, and I accomplish this by suffering hot water to run into the shaft C, and from thence into the arm G′, and out of its perforations while the said arm and shaft are in revolution together, so as to cause the arm to pass over the upper surface of a mass of ground bark, placed in the vat and on its strainer. As the liquid leaves the mass it will flow through the strainer or false bottom and into the space below it, from which it may be extracted or drawn off through a hole or spout leading out of such space. An endless belt from any suitable driving motor will suffice to put the apparatus in action, provided such belt be run on the driving-pulley thereof.

I would remark that the holes of the strainer should be numerous, and as near as possible at equal distances apart, in order that the discharge of the liquid from the lower surface of the mass of bark upheld by the strainer may be uniform.

The even infiltration of the liquid into, and its even discharge from, the mass of bark, is a matter of necessity in order to obtain the best or most thorough extraction of the tannin.

I claim—

1. The process herein described of leaching bark or extracting the soluble ingredients from substances containing the same by the application to the bark or other substance of the leaching or solving liquid in the manner hereinbefore set forth, distributing the said liquid in fine streams or spray evenly over the surface, and letting it percolate into and through the mass of bark or substance until it shall become duly saturated, and keeping up the supply of liquid, as set forth, until the said bark or substance shall be exhausted, substantially as specified.

2. The herein-described apparatus for leaching bark or for extracting the soluble matter from solid substances containing the same—that is to say, the combination, with a vat or tub of suitable form, of a false bottom and rotating distributing-arm, the whole being constructed for operation, substantially as set forth.

3. Proportioning the areas of the aperture in the rotatory distributing-arm to the distance of each from its center of revolution, so that a uniform quantity of liquid shall be distributed over and through the mass, substantially in the manner set forth.

In testimony whereof I have signed my name to this specification before two subscribing witnesses.

WILLIAM H. ALLEN.

Witnesses:

A. POLLOK,

JOSEPH GAVETT.